United States Patent
Christopher et al.

(10) Patent No.: US 9,026,625 B2
(45) Date of Patent: May 5, 2015

(54) SYSTEM AND METHOD OF MAC ADDRESS ASSIGNMENT USING DYNAMIC MAC ADDRESS PROTOCOL

(75) Inventors: Samvinesh Christopher, Suwanee, GA (US); Varadachari Sudan Ayanam, Suwanee, GA (US)

(73) Assignee: American Megatrends, Inc., Norcross, GA (US)

( * ) Notice: Subject to any disclaimer, the term of this patent is extended or adjusted under 35 U.S.C. 154(b) by 317 days.

(21) Appl. No.: 13/567,210

(22) Filed: Aug. 6, 2012

(65) Prior Publication Data

US 2014/0040440 A1 Feb. 6, 2014

(51) Int. Cl.
*G06F 15/177* (2006.01)
*G06F 15/173* (2006.01)
*H04L 29/12* (2006.01)
*G06F 3/00* (2006.01)

(52) U.S. Cl.
CPC ........ *H04L 61/2038* (2013.01); *H04L 61/6022* (2013.01); *G06F 15/177* (2013.01); *G06F 3/00* (2013.01); *H04L 61/10* (2013.01); *H04L 61/00* (2013.01); *H04L 61/103* (2013.01)

(58) Field of Classification Search
None
See application file for complete search history.

(56) References Cited

U.S. PATENT DOCUMENTS

| | | | |
|---|---|---|---|
| 5,892,912 A * | 4/1999 | Suzuki et al. | 370/395.53 |
| 7,421,478 B1 * | 9/2008 | Muchow | 709/209 |
| 7,716,356 B2 * | 5/2010 | Bauman et al. | 709/230 |
| 7,730,197 B2 * | 6/2010 | Bauman et al. | 709/230 |
| 7,822,406 B2 * | 10/2010 | Lee et al. | 455/411 |
| 8,184,631 B2 * | 5/2012 | Kunhappan et al. | 370/392 |
| 8,286,193 B2 * | 10/2012 | Pope et al. | 719/319 |
| 8,385,230 B2 * | 2/2013 | Kuehnel et al. | 370/255 |
| 8,401,024 B2 * | 3/2013 | Christensen et al. | 370/395.53 |
| 8,443,365 B2 * | 5/2013 | Kumar | 718/1 |
| 8,463,825 B1 * | 6/2013 | Harty et al. | 707/813 |
| 8,539,484 B1 * | 9/2013 | Offer et al. | 718/1 |
| 8,549,187 B1 * | 10/2013 | Christopher et al. | 710/9 |
| 8,595,723 B2 * | 11/2013 | Garrett et al. | 718/1 |
| 8,601,159 B2 * | 12/2013 | Brown et al. | 709/245 |
| 2007/0249323 A1 * | 10/2007 | Lee et al. | 455/411 |
| 2008/0005329 A1 * | 1/2008 | Bauman et al. | 709/226 |
| 2008/0005343 A1 * | 1/2008 | Bauman et al. | 709/230 |
| 2008/0059623 A1 | 3/2008 | Yang et al. | |
| 2008/0155069 A1 * | 6/2008 | Kunhappan et al. | 709/220 |
| 2008/0175246 A1 * | 7/2008 | Kunhappan et al. | 370/392 |
| 2008/0212591 A1 * | 9/2008 | Wu et al. | 370/395.21 |
| 2009/0049199 A1 * | 2/2009 | Kuik et al. | 709/245 |
| 2009/0125615 A1 * | 5/2009 | Murray et al. | 709/221 |
| 2009/0327462 A1 * | 12/2009 | Adams et al. | 709/222 |
| 2011/0022695 A1 * | 1/2011 | Dalal et al. | 709/222 |
| 2011/0088032 A1 * | 4/2011 | Garrett et al. | 718/1 |

(Continued)

*Primary Examiner* — Brian P Whipple
*Assistant Examiner* — Michael A Chambers
(74) *Attorney, Agent, or Firm* — Morris Manning & Martin, LLP; Tim Tingkang Xia, Esq.

(57) ABSTRACT

A hypervisor and a DMAP server in a network are described herein. The hypervisor is configured to generate a universally unique identifier (UUID), associate the UUID with a virtual NIC, construct a discover message including the UUID and the hypervisor's network address, broadcast the discover message in the network. The DMAP server is configured to generate a MAC address that is unique in the network, receive the discover message, and associate the generated MAC address with the UUID in response to the discover message, construct an offer message having the MAC address, the UUID, and the network address of the DMAP server, and transmit the offer message to the hypervisor.

26 Claims, 6 Drawing Sheets

(56) References Cited

U.S. PATENT DOCUMENTS

| | | | |
|---|---|---|---|
| 2011/0194563 A1* | 8/2011 | Shen et al. | 370/395.52 |
| 2012/0059930 A1* | 3/2012 | Devarakonda et al. | 709/224 |
| 2012/0084408 A1 | 4/2012 | Ayanam et al. | |
| 2012/0110574 A1* | 5/2012 | Kumar | 718/1 |
| 2012/0291028 A1* | 11/2012 | Kidambi et al. | 718/1 |
| 2013/0152075 A1* | 6/2013 | Cardona et al. | 718/1 |
| 2013/0294451 A1* | 11/2013 | Li et al. | 370/392 |

* cited by examiner

| UUID 452 | MAC Address 454 |
|---|---|
| UUID #1 | MAC Address #1 |
| UUID #2 ("550e8400-ez96-41d4...") | MAC Address #2 ("00:16:3E:00:00:12") |
| UUID #3 | MAC Address #3 |
| Empty | MAC Address #4 |
| ... | ... |

411 — UUID #1 row
412 — UUID #2 row
413 — UUID #3 row
414 — Empty row

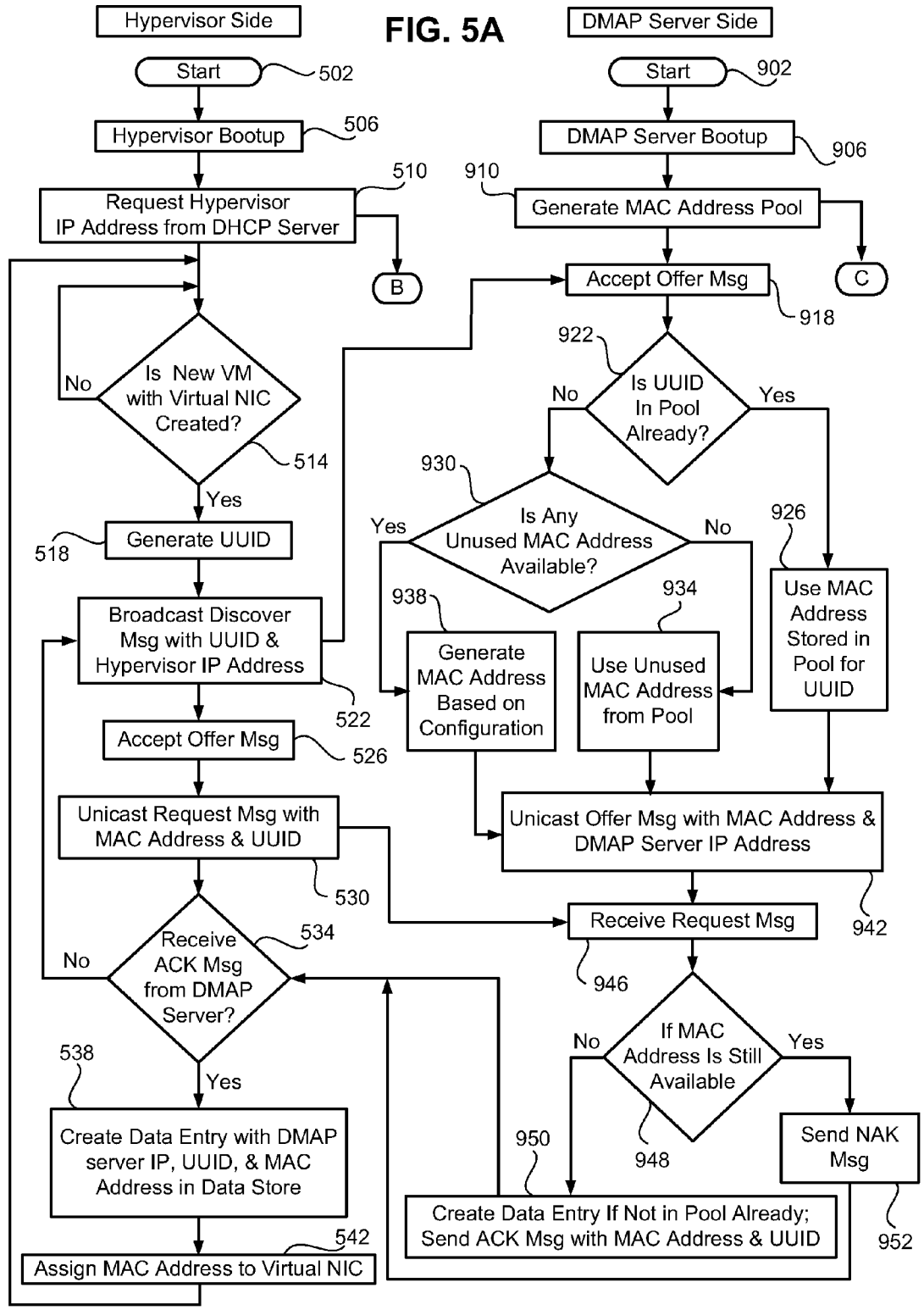

SYSTEM AND METHOD OF MAC ADDRESS ASSIGNMENT USING DYNAMIC MAC ADDRESS PROTOCOL

FIELD

The present disclosure relates generally to computer networking, and in particular, to computer systems that assign MAC addresses using Dynamic MAC Address Protocol.

BACKGROUND

With the emergence of server partitioning, a single server can be made to run as if it were two or more servers. Server partitioning offers a number of advantages to information technology (IT) departments of growing businesses. For example, system administrators can consolidate multiple applications into a single server box, thereby centralizing management, saving space, and potentially lowering IT costs.

As virtualization and server partitioning become increasingly common, the level of virtualization, i.e., the number of logical systems concurrently executing in each server, will continue to increase. For example, in a hypervisor hosting a number of virtual machines, each virtual machine typically requires its own network connection. A network connection is typically established through a network interface device, for example, a network interface controller (NIC) or network adapter. However, providing each virtual machine with its own Ethernet adapter can be very expensive because of the cost of network adapter cards. Furthermore, Input/Output (IO) enclosures required to house the adapters may take valuable space on the server.

One solution is to develop a virtualized network interface controller which is capable of supporting a virtual machine (VM). A virtualized network interface controller can be provided in a virtual machine, and a guest operating system run by the virtual machine may use a network interface adapter to access the virtual network interface controller. Each network interface adapter requires a unique Media Access Control (MAC) address. Traditionally, network interface controllers had MAC addresses permanently burned into the adapter, providing a unique MAC address for each physical port of the controller.

In virtual machine environments, the hypervisor will control the physical devices, and the virtual machines will be provided virtual devices. For communicating to the VM, the virtualized network interface controller requires a unique MAC address. The OUI part of the MAC is normally assigned to the hypervisor manufacturer by IEEE. For example, for XEN hypervisor the OUI is "00:16:3E". Assigning a unique NIC part of the MAC address is a challenging task, especially in a large network with a significant number of virtual machines.

Therefore, a unaddressed need exists in the art to address the aforementioned deficiencies and inadequacies.

SUMMARY

Certain aspects of the present disclosure are directed to a system. The system includes a hypervisor running on a first computing device in a network, the hypervisor hosting a first virtual machine having a first virtual network interface controller (NIC), the hypervisor being assigned a first network address, the hypervisor executing a dynamic MAC address protocol (DMAP) client; and a dynamic MAC address protocol (DMAP) server running on a second computing device in the network, the DMAP server being assigned a second network address. The hypervisor and the DMAP client are configured to generate a first universally unique identifier (UUID), associate the first UUID with the first virtual NIC, construct a first discover message including the first UUID and the first network address, broadcast the first discover message in the network, receive a first offer message that is in response to the broadcasted discover message, the first offer message having a first MAC address, the first UUID, and the second network address, and assign the first MAC address to the first virtual NIC. The DMAP server is configured to generate the first MAC address, receive the first discover message having the first UUID broadcasted in the network, associate the first MAC address with the first UUID, construct the first offer message, and transmit the first offer message to the hypervisor using the first network address included in the first discover message.

In certain embodiments, the DMAP server is configured to generate a set of three bytes and combine a predetermined organizationally unique identifier (OUI) and the set of three bytes to generate the first MAC address.

In certain embodiments, the DMAP server is configured to detect a first request message addressed to the DMAP server and indicating that the hypervisor has accepted the first offer message, determine whether the first MAC address is still available to be associated with the first UUID, transmit an acknowledgment message including the first MAC address and the first UUID to the hypervisor, where the first MAC address is still available, and transmit a negative acknowledgment message to the hypervisor, where the first MAC address is no longer available.

In certain embodiments, the hypervisor and the DMAP client are configured to construct a first request message including the first MAC address and the first UUID, after accepting the first MAC address included in the first offer message, and transmit the first request message to the DMAP server.

In certain embodiments, the hypervisor and the DMAP client are configured to, as a condition of assigning the first MAC address to the first virtual NIC, detect an acknowledgement message including the first MAC address and the first UUID transmitted from the DMAP server, and create a first data entry, in a data module of the hypervisor, that includes the second network address, the first UUID, and the first MAC address.

Certain aspects of the present disclosure are directed to a method for dynamically assigning MAC addresses to a hypervisor running on a first computing device by a dynamic MAC address protocol (DMAP) server running on a second computing device in a network, the hypervisor hosting a first virtual machine having a first virtual network interface controller (NIC), the hypervisor being assigned a first network address, the hypervisor executing a dynamic MAC address protocol (DMAP) client, the DMAP server being assigned a second network address. The method includes, at the hypervisor and the DMAP client, generating a first universally unique identifier (UUID); associating the first UUID with the first virtual NIC; constructing a first discover message including the first UUID and the first network address; broadcasting the first discover message in the network; receiving a first offer message that is in response to the broadcasted discover message, the first offer message having a first MAC address response including a first NIC part, the first UUID, and the second network address; determining a first MAC address using the first MAC address response; and assigning the first MAC address to the first virtual NIC. The method further includes, at the DMAP server, generating the first MAC address response; receiving the first discover message broadcasted in the network; associating the first MAC address with the first UUID; constructing the first offer message; and transmitting the first offer message to the hypervisor using the first network address in the first discover message.

Certain aspects of the present disclosure are directed to a dynamic MAC address protocol (DMAP) server running on a computing device in a network, the DMAP server being assigned a second network address, the DMAP server including computer-executable instructions stored thereon and, when executed, causing the DMAP server to be configured to generate a first NIC part of a MAC address, receive a first discover message having a first UUID and a first network address broadcasted in the network, associate the first NIC part with the first UUID, construct a first offer message having a first MAC address response including a first NIC part, the first UUID, and the second network address, and transmit the first offer message to the first network address.

These and other aspects of the present disclosure will become apparent from the following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the detailed description and the accompanying drawings, wherein:

FIG. 4 schematically illustrates a MAC address table of a DMAP server in accordance with certain embodiments of the present disclosure; and FIGS. 5A-B are flowcharts illustrating interactions between a hypervisor and a DMAP server in accordance with certain embodiments of the present disclosure.

DETAILED DESCRIPTION

Figure 1:
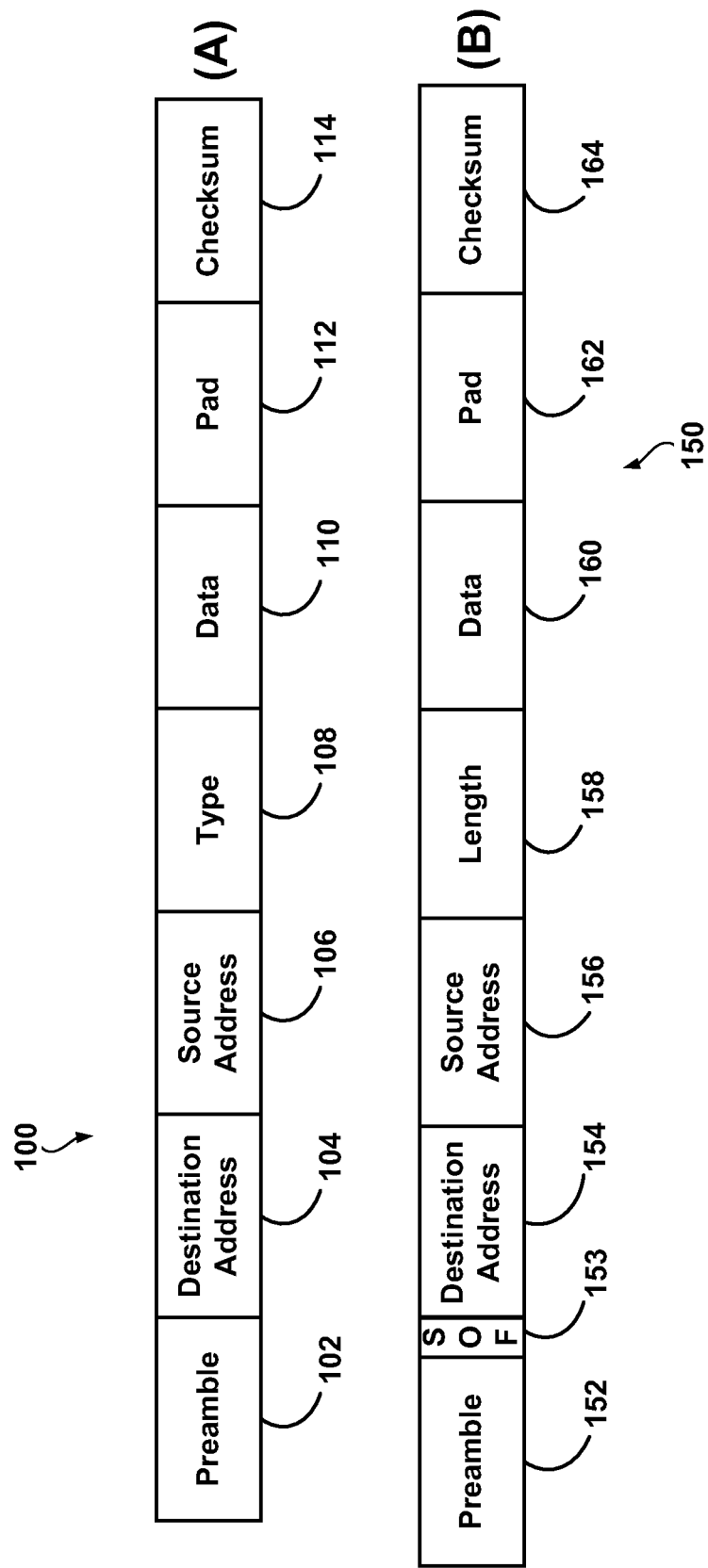
FIGS. 1A-B schematically illustrate frame formats in accordance with Ethernet and IEEE 802.3.

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, "plurality" means two or more.

As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

FIG. 1A illustrates the frame format 100 in accordance with Ethernet. FIG. 1B illustrates the frame format 150 in accordance with IEEE 802.3. In the Ethernet format, the data frame has preamble 102, destination address 104, source address 106, type 108, data 110, pad 112, and checksum 114 fields. In the IEEE format, the data frame has preamble 152, start of frame 153, destination address 154, source address 156, length 158, data 160, pad 162, and checksum 164 fields. Since Ethernet and IEEE 802.3 are identical except for some minor differences, the present disclosure uses the terms Ethernet and IEEE 802.3 interchangeably, unless otherwise noted.

The destination address 104, 154 and the source address 106, 156 are each 6 bytes long. The source addresses 106, 156 are globally unique to ensure that no two stations anywhere in the world would have the same address. The idea is that a new station can uniquely address any other station by just leaving the right 48 bit number. To do this, the first 3 bytes of the address field are used for an organizationally unique identifier (OUI). Values for this field are assigned by IEEE and indicate a manufacturer. Manufacturers are assigned blocks of $2^{24}$ addresses. The manufacturer assigns the last 3 bytes of the addresses and programs the complete address into a network interface controller (NIC) before it is sold.

Figure 2:
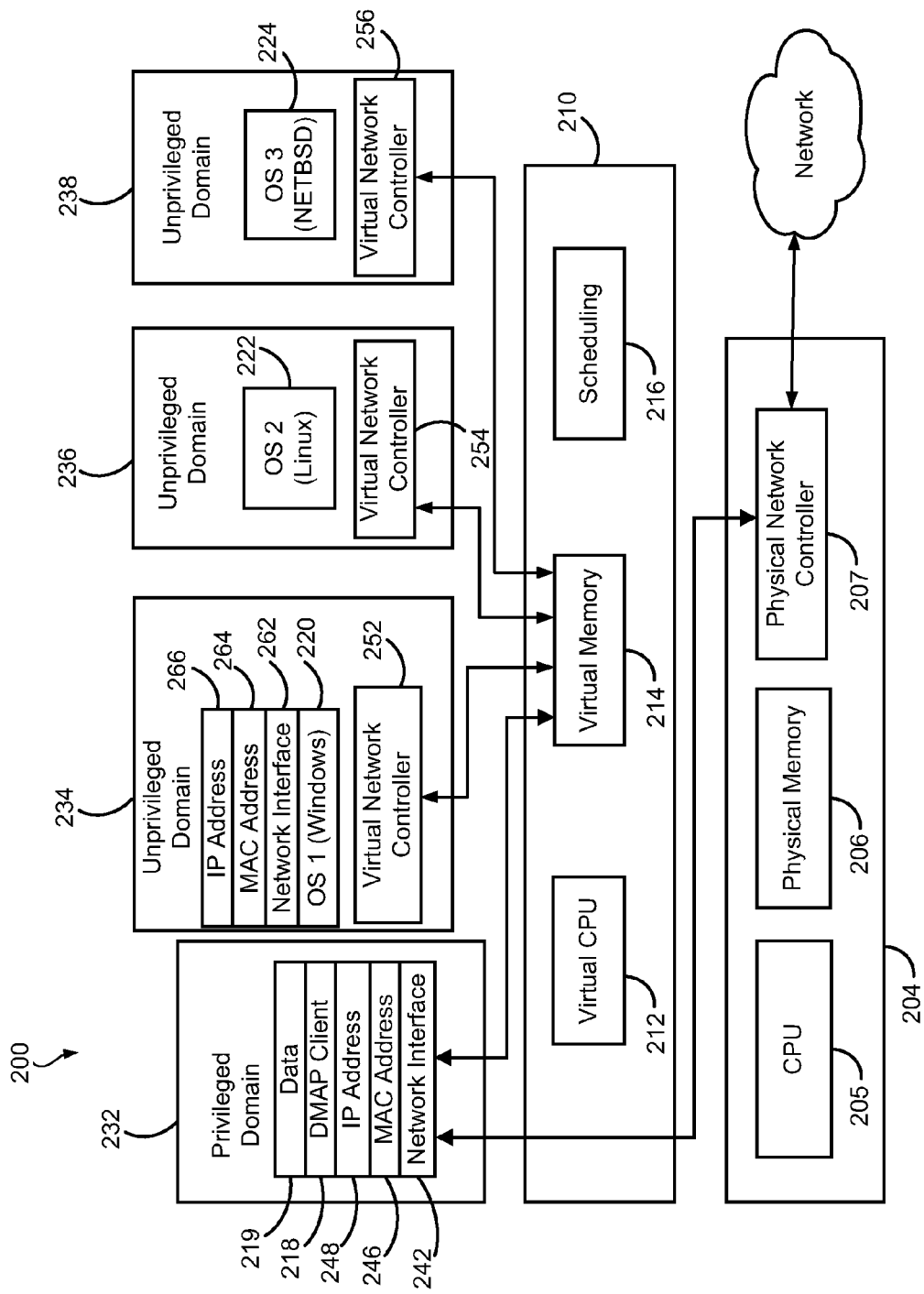
FIG. 2 schematically illustrates a computer system in which a hypervisor hosting multiple unprivileged domains or virtual machines in accordance with certain embodiments of the present disclosure.

FIG. 2 illustrates a computer system 200 in which a hypervisor 210 hosting multiple unprivileged domains or virtual machines 234, 236, 238 in accordance with certain embodiments of the present disclosure. Virtualization allows a number of virtual servers (such as an operating system 220, 222, 224) to be consolidated into a single physical machine 204, without losing the security gained by having completely isolated environments. Virtualization makes it relatively easy to migrate virtual machines from one physical computer to another, making it easy to keep redundant virtual server images synchronized across physical machines. A virtual machine gets certain features, such as cloning, at a very low cost. A virtual machine can be migrated to another host if the hardware begins to experience faults, or if an upgrade is scheduled. It can then be migrated back when the original machine is working again.

In certain embodiments, a hypervisor 210 is running on the computer system 200. Stated in a simplified way, the hypervisor 210 runs on top of the hardware including the CPU 205 and the physical memory 207. In certain embodiments, the hypervisor 210 can be stored or pre-built in a flash ROM of the computer system 200. Alternatively, the hypervisor can be stored or pre-built in the hard drive of the computer system 200. The hypervisor provides, among other thing, virtual CPUs 212, virtual memories 214, and scheduling services 216, and a Dynamic MAC Address Protocol (DMAP) client (which will be described in detail below) to the virtual machines or guests (such as hosted operating systems 220, 224, 228) installed on top of the hypervisor 210. The hypervisor 210 hosts virtual machines or domains 234, 236, 238, which encapsulate a complete running virtual environment. The hypervisor 210 typically runs a domain or virtual machine 232 having higher security privilege, which is sometimes referred to as a privileged domain and, optionally, one or more domains 234, 236, 238 having lower security privilege, which are sometimes referred to as unprivileged domains. In certain embodiments, a process in the privileged domain 232 typically can have access to hardware such as physical devices of the computer system and their drivers, while guests run by the unprivileged domains 340, 350 typically cannot.

In the example shown in FIG. 2, the hypervisor 210 provides a privileged domain 232. The hypervisor 210 itself may not include any device drivers, nor a user interface. These can all be provided by the system and user space tools running in the privileged domain 232 as guests. The privileged domain guest can be, but not necessarily is, operating systems such as WINDOWS, LINUX, NETBSD, and SOLARIS. Common tasks performed by the privileged domain guest are to handle devices. This guest runs at a higher level of privilege than others, and can access the hardware. For this reason, it is vital that the privileged guest be properly secured. In certain embodiments, the hypervisor 210 does not necessarily rely on a privileged domain guest to provide those functions. The hypervisor itself can provide those functions such as device drivers.

One skilled in the art would appreciate that the hypervisor 210 can also run on two CPUs, four CPUs, eight CPUs, or any suitable number of CPUs. The hypervisor 210 can be of various types and designs, such as XEN, MICROSOFT HYPER-V, VMWARE ESX. The hypervisor 210 can emulate one or more virtual machines or domains 234, 236, 238. An operating system 220, 222, 224 can be installed in a virtual machine 234, 236, 238. The operating system 220, 222, 224 may not realize that it is running on virtual machine and may perceive that it is running on a physical machine. The operating systems 220, 222, 224 running on the virtual machine 234, 236, 238 can host one or more application programs.

The computer system 200 includes the physical network controller 207. In certain embodiments where the hypervisor 210 utilizes a privileged domain 232, the privileged domain 232 runs a network interface (or driver, adapter) that is communicative with the physical network controller 242. In certain embodiments, the network interface 242 can be part of the hypervisor 304. The physical network controller 207 is assigned an MAC address as discussed above. The network interface 242 in the privileged domain can be associated with the MAC address 246 of the physical network controller and uses that MAC address to send and receive Ethernet (or IEEE 802.3) frames. The physical network interface controller 207 can also include a network program for processing network communications sent to and from the network controller 207. The network program forwards network packets sent from a remote computer addressed to the MAC address 246 to the network interface 242 running in the privileged domain 232 or as part of the hypervisor 210. The MAC address 246 assigned to the physical network controller 207 can be considered as the MAC address of the hypervisor. The network interface 242 is the destination of network frames addressed to the MAC address 246.

In certain embodiments, the hypervisor can request an IP address, for example from a DHCP in the network, for the network interface 242 in the privileged domain. The IP address is associated with the MAC address of the physical network controller. The IP address 248 identifies the network interface 242 on the TCP/IP network so that network packets may be routed to and from the network interface 242 in the privileged domain 232 using the IP address 248. The IP address 248 may also be allocated a domain name that may be utilized in a URL to identify one or more Web pages available from a Web server application program.

In certain embodiments, the hypervisor 210 hosts one or more unprivileged domains 234, 236, 238. Each of the unprivileged domains 234, 236, 238 can run a guest, such as an operating systems. For example, the first unprivileged domain 234, the second unprivileged domain 236, and the third unprivileged domain 238 can run WINDOWS, LINUX, and NETBSD operating systems respectively. An unprivileged domain 234, 236, 238 can provide a virtual network controller 252, 254, 256. From the perspective of a guest run in the unprivileged domain 234, 236, 238, the virtual network controller 252, 254, 256 appears as a physical network controller to the guest. The guest, such as the operating system 220, 222, 224 can utilize the virtual network controller 252, 254, 256 to access the network. For example, the operating system 220 in the unprivileged domain 234 can have a network interface for communicating with the virtual network controller 252. In order to support the operating system 220 run in the unprivileged domains 234 to access an Ethernet network and/or IP network, the virtual network controller 252 can be assigned a MAC address 264 and/or IP address 266.

User can manually assign a unique MAC address for each virtual network interface controller 252, 254, 256 on every virtual machine (or unprivileged domain) 234, 236, 238. For small environments this may be the easiest approach. For medium to large environments, however, this approach requires intensive manual work and can be highly errorprone. For example, it is required to maintain a log of MAC addresses and VMs because VMs can be migrated from one physical machine to another and has to be manually reassigned another MAC address.

In certain embodiments, the hypervisor 210 can be configured to assign a MAC address 264 to a virtual network controller 252. The hypervisor typically is assigned an OUI by IEEE. For example, the XEN hypervisor is assigned an OUI of "00:16:3E". The hypervisor can generate a MAC address using that OUI as the first 3 bytes of the MAC address. The hypervisor can generate, for example randomly, the last 3 bytes of the MAC address. Each hypervisor can have a mechanism that takes necessary steps to generate mutually unique MAC addresses. For example, the hypervisor 210 can generate and assign a MAC address of "00:16:3E:00:00:12" to the virtual network controller 252 of the first unprivileged domain 234. This approach requires no manual intervention and can work easily for small to large networks (up to $255^3$ VMs).

Even though a hypervisor 210 can provide unique MAC addresses to the virtual network interface controllers in the VMs 234, 236, 238 hosted on that hypervisor 210, there is a high probability of duplicated MAC addresses across different hypervisors on the same network. For example, two different hypervisors each may assign the same MAC address to a respectively hosted VM. This can result in complete network disturbances. Even though there are $255^3$ unique addresses that can be generated, the probability of duplication cannot be ignored. It has been suggested that the probability of duplications is 1% for a network with 600 VMs, 3% for a network with 1000 VMs, and 95% for a network with 10,000 VMs. So even in cases of small networks, there is always a possibility of duplication. In large networks such as datacenters, there may be multiple duplications.

Figure 3:
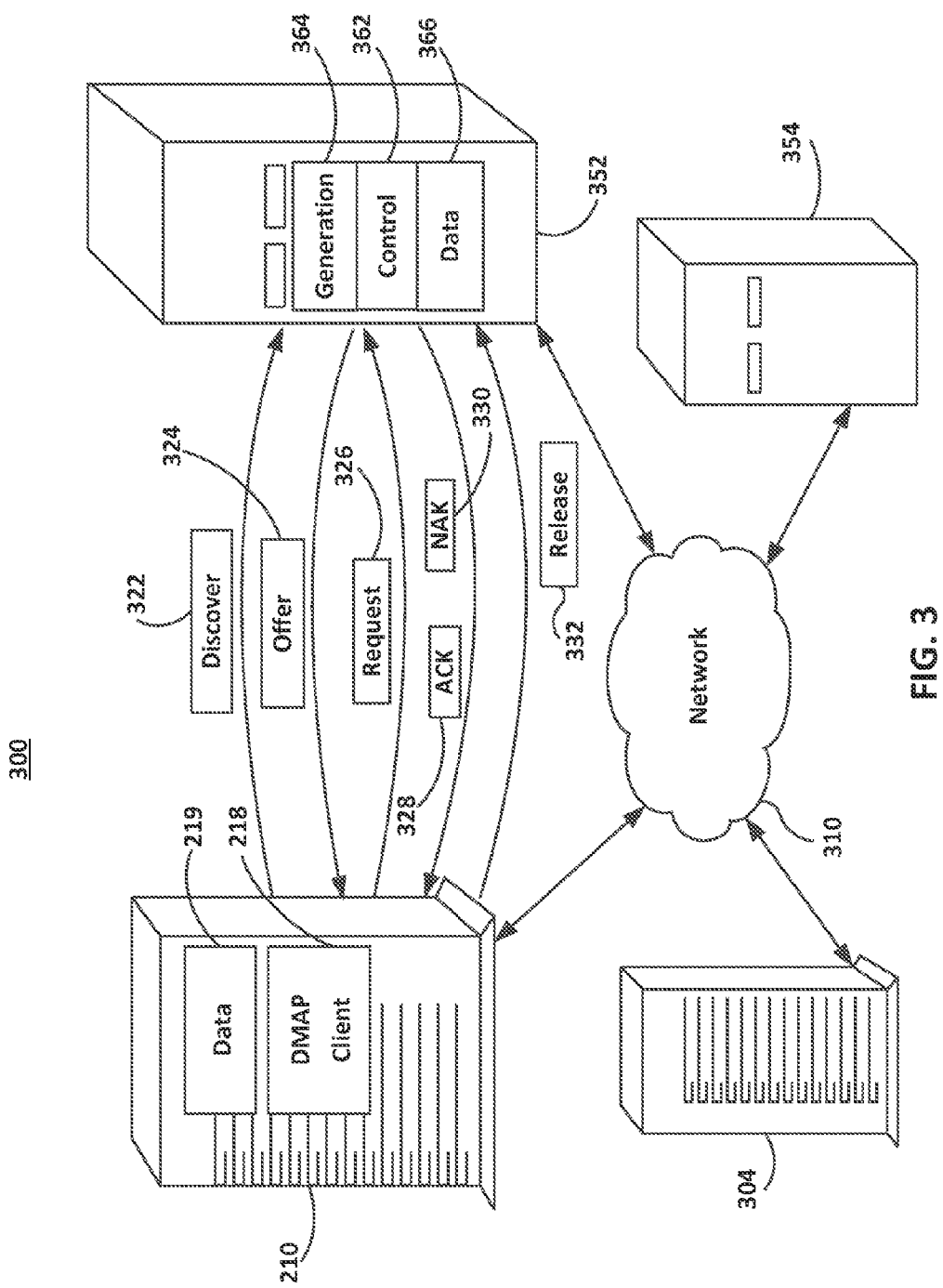
FIG. 3 schematically illustrates a networked computer system having hypervisors and DMAP servers in accordance with certain embodiments of the present disclosure.

FIG. 3 schematically illustrates a networked computer system having one or more hypervisors 210, 304 and one or more DMAP servers 352, 354 in accordance with certain embodiments of the present disclosure. A hypervisor 210 and a DMAP server 352 can run on respectively different computing devices. For example, the hypervisor 210 can utilize the DMAP server 352 located in the network 310, e.g. a local subnet, to obtain MAC addresses for the virtual network controllers 252, 254, 256. In general, the hypervisor 210 employs the DMAP client 218 to transmit requests to the DMAP server 352. The DMAP server detects the requests for MAC addresses, and assigns and returns, MAC addresses to the hypervisor 210.

The DMAP client 218 requests a dynamic MAC address for a virtual network interface controller 252 of the hypervisor 210 by broadcasting a discover message 322 in the local network 310. After sending the discover broadcast, the DMAP client 218 waits a predetermined period of time for a DMAP server 352 to respond with an offer message 324. In certain embodiments, the discover message 322 can be encapsulated in a UDP/IP packet. The DMAP can designate a destination UDP port number, for example 9999, for use by the DMAP server 352. A local IP broadcast address of 255.55.255.55 and the designated UDP port number can be used in the discover packet 322. If the DMAP server 352 is not on the local network, and IP router can use a DMAP-relay agent to forward the discover packets 322 to other subnetworks.

In certain embodiments, the DAMP client 218 constructs the discover message 322 to include the client network address, such as an IP address or MAC address, and a universally unique identifier (UUID) associated or assigned to that virtual interface controller. The client address can be the same as the IP address 248 or MAC address 246 of the hypervisor on which the DMAP client is running. A UUID is an identifier that is unique across both space and time, with respect to the space of all UUIDs. The hypervisor 210 or the DMAP client 218 can generate the UUID. For example, a UUID can have a fixed size and contains a time field; it is possible for values to rollover (around A.D. 3400, depending on the specific algorithm used). A UUID can be a 16-byte (128-bit) number. In its canonical form, a UUID is represented by 32 hexadecimal digits, displayed in five groups separated by hyphens, in the form 8-4-4-4-12 for a total of 36 characters (32 digits and four hyphens). "550e8400-e29b-41d4-a716-446655440000" is an example of a UUID. UUIDs have several versions. A version of the UUID is described in Network Working Group Request for Comments No. 4122, which is incorporated herein by reference in its entirety.

After the hypervisor 210 creates a virtual machine having a virtual network interface controller 252, the hypervisor 210 can generate a UUID and assign the UUID to the virtual network interface controller 252. The hypervisor 210 can use the UUIDs to identify different virtual network interface controllers 252, 254, 256 and to request unique MAC addresses from the DMAP servers 352, 354. In other words, each of the virtual network interface controller 252, 254, 256 provided by the hypervisor 210 can be associated or assigned a UUID. The hypervisor 210 can use a given UUID to locate or identify a virtual network interface controller 252 of the hypervisor.

In certain embodiments, the DMAP server 352 allocates MAC addresses to clients according to the configuration set up for the server by a DMAP administrator. MAC addresses can be allocated dynamically. In dynamic allocation, a client can be allocated any address out of an address pool. An address pool 219 can be a list of MAC addresses that are available for allocation. In certain embodiments, an address pool 219 can be specific for a particular network. When receiving a request for a MAC address from a client, the DMAP server 352 checks its configuration and retrieves a MAC address from an appropriate MAC address pool 219.

The DMAP server 352 can have a control module 362 that manages and controls the other modules of the DMAP server 352. The DMAP server 352 can employ a generation module 364 that generates MAC addresses that are unique to each other. Where there are more than one DMAP server in the local network, the DMAP servers 352, 354 can employ necessary mechanism, for example by communicating with each other, to ensure that the MAC addresses generated by all DMAP servers 352, 354 are unique to each other.

In certain embodiments, the generation module 364 uses an OUI that is preset for the DMAP server for the first 3 bytes of a MAC address. For example, the DMAP administrator can configure the DMAP server to use the same OUI ("00:16: 3E") as the XEN hypervisor or request another OUI from IEEE. The generation module 364 can generate another set of 3 bytes as the last 3 bytes of a MAC address, and such that a unique MAC address is constructed using the OUI and the generated set of 3 bytes. The MAC addresses generated by the generation module 364 are unique to each other. The generated MAC addresses, i.e., full MAC addresses each having 6 bytes, are sent to the requesting DMAP clients.

In certain embodiments, the generation module 364 generates a NIC part of a MAC address such as the set of 3 bytes that can be used as the last 3 bytes of a MAC address. The DMAP server can construct a MAC address response which has the NIC part such as the set of 3 bytes (i.e., a partial MAC address) to a requesting DMAP client 218. The DMAP client 218 or the hypervisor 210, after receiving the MAC address response or the partial MAC address, can use the OUI of the hypervisor and the received NIC part to construct a unique MAC address. In certain embodiments, the MAC address response can include a full MAC address. The term MAC address used below in this disclosure refers to both full and partial MAC addresses, unless otherwise noted.

The DMAP server 352 can have a data module 366, such as an address pool, to store the generated MAC addresses. In certain embodiments, the data module 366 can be implemented by a table having data entries that each includes a unique MAC address. FIG. 4 schematically illustrates such a MAC address table 400. The MAC address table has multiple data entries 411-414. Each of the data entries 411-414 has a first field 452 for storing a UUID and a second field 454 for storing a MAC address. In certain embodiments, the DMAP server 352 can initially generates a predetermined number (e.g., 100) of unique MAC addresses and store them in the data entries 411-414 of the data module (e.g., a table 400). As will be described below, each of the unique MAC addresses in the data module 366 can be associated with a UUID. In other words, a UUID can be assigned, or associated with, a MAC address generated by the generation module 364. The UUID is stored in the same data entry in which the associated MAC address is stored. The data module allows the DMAP server to retrieve the associated MAC address by using the UUID as a key. In the example shown in FIG. 4, the DMAP server 352 can, more specifically the control module 362 of the DMAP server 352 can instruct the data module 366 to, look for a particular UUID (e.g., "550e8400-e29b-41d4-a716-446655440000") in the table 400. The DMAP server 352 finds that that particular UUID is in the second data entry 412 of the table 400. Thus, the DMAP server 352 can retrieve, from the second data entry 412, the MAC address (e.g., ""00: 16:3E:00:00:12") associated or offered to that UUID.

The DMAP server 352 monitors or detects the broadcasted discover messages/packets 322 on the network. When the DMAP server 352 receives a discover message, it attempts to offer a MAC address to the DMAP client that is sending the discover message. The DMAP server 352 examines the discover message 322 and extracts the client network address and the UUID included in the discover message. The DMAP server 352 then look for the UUID in the data module 366 and determines whether a MAC address has already been offered to this UUID and stored in the data module 366. If the DMAP server 352 finds a data entry in the data module 366 having the same UUID, the DMAP server 352 determines that a MAC address has been offered or assigned to that UUID and saved in the same data entry. Thus, the DMAP server retrieves the MAC address from the data module 366 and send that MAC address to the DMAP client 218 requesting a MAC address. If the DMAP server 352 cannot find a data entry in the data module 366 having the same UUID as that of the discover message 322, the control module 362 can instruct the generation module 364 to generate a new MAC address, or the control module can retrieve, from the data module, a MAC address that does not have an associated UUID (e.g. the MAC address in the data entry 414 of the MAC address table 400). The control module 362 can offer that MAC address to the DMAP client 218.

The DMAP server 352 can construct an offer message 324 and send, through unicast, the offer message 324 back to the DMAP client 218 using the network address extracted from the discover message 322. The offer message can include, for example, the UUID that is used to request a MAC address, configuration parameters including the MAC address being offered to the UUID, as well as parameters, such as the IP address or MAC address of the DMAP server 352, for identifying the offering DMAP server 352. In certain embodiments, the DMAP server 352 can encapsulate the offer message 324 in a UDP/IP packet having a destination address identify the physical network interface controller 207 of the computer system 200. The offer message 324 is transmitted to the physical network interface controller 207 and eventually sent to the DMAP client 218 running on the hypervisor 210.

As mentioned above, after broadcasting the discover message 322 the DMAP client waits for a predetermined period of time (e.g. 30 seconds) to receive offer messages 324 from DMAP servers 352. In certain embodiments, there may be more than one DMAP server 352, 354 in the network. In this case, the DMAP client may receive more than one offer messages 324 sent from different DMAP servers 352, 354. The DMAP client 218 can then select one offer message and discard the other offer messages, based on a set of predetermined rules. For example, the DMAP client 218 can select the first or the last offer message received.

After selecting an offer message 324 from a DMAP server 352, the DMAP client 218 can construct and send a request message 326 to the selected DMAP server. The request message 326 can use the address of DMAP server 352 in the offer message 324 as the destination address. The request message includes the UUID of the DMAP client 218, and the MAC address offered to the UUID by the DMAP server 352, and the network address of the DMAP client 218 (e.g. the MAC address/IP address of the physical network controller 207). The request message 326 can be encapsulated in a UDP/IP packet and then transmitted to the DMAP server 352 through unicast using the DMAP server's network address.

After receiving the request message, the control module 362 of the selected DMAP server 352 retrieves the MAC address from the request message 326 and determines whether that offered MAC address is still available. In certain circumstances, the MAC address may have been offered to a different UUID and the associated virtual network interface controller. If the MAC addresses previously offered to the UUID is not available any more, the control module 362 sends a negative acknowledgment message 330 back to the hypervisor. The negative acknowledgment message can include the UUID and the MAC address. If the MAC address is still available, the DMAP server 352 can determine that the DMAP client 218 has accepted the MAC address offered to that UUID, and can construct and send an acknowledgment message 328 back to the DMAP client 218 to acknowledge that it confirms the DMAP client's acceptance of the MAC address offered by the DMAP server 352. The acknowledgment message can include the offered and accepted MAC address and the UUID. In addition, the control module can save this pair of UUID and MAC address in the data module 366. For example, the UUID can be saved in the first field 452 of the data entry 414, when the MAC Address #4 stored in the second field 454 is offered to that UUID. In this way, when receiving a discover message having the same UUID that requests a MAC address again from the DMAP server next time, the DMAP server 352 can use the UUID to locate the data entry having the previously offered MAC address, and then sends the same MAC address to the requesting DMAP client 218.

The acknowledgment message 328 can be encapsulated in a UDP/IP packet and transmitted to the DMAP client 218 running on the hypervisor 210 through the physical network interface controller 207. After receiving the acknowledgment message 328, the hypervisor 210 can retrieve the information regarding the MAC address from the DMAP client 218 and create a data entry in a data module 219 of the hypervisor 210. The data entry can include the UUID, the MAC address offered to that UUID, and the network address (e.g., IP address or MAC address) of the DMAP server 352 offering the MAC address. The hypervisor 210 then assigns the MAC address to the virtual network interface controller 252, 254, 256 associated with the UUID.

When the hypervisor 210 turns off or shut down a virtual machine 234 having a virtual network controller 252 associated with a UUID, the hypervisor 210 retrieves the data entry having that UUID from the data module 219 of the hypervisor 210. The hypervisor 210 can construct a release message 332 including the UUID and the MAC address assigned to that virtual network controller 252, and the IP address or MAC address of the DMAP server 352 offering the MAC address. The hypervisor 210 then send the release message 332 to the DMAP server 352. After the DMAP server 352 receives the release message 332, the control module 362 of the DMAP server 352 can instruct the data module 366 to locate the data entry having the UUID, and delete the UUID form that data entry, thus marking the MAC address as un-assigned.

FIG. 5 is a flowchart illustrating the interactions between the hypervisor 210 and the DMAP server 352. After start at operation 502, the computing device 200 running the hypervisor 210 boots up at operation 506. At operation 510, the hypervisor 210 send the MAC address of the physical network controller 207 to a DHCP server in the network at operation 510. The hypervisor receives an IP address assigned by the DHCP server to the physical network interface controller 207. At operation 514, control of the hypervisor determines whether a new virtual machine or guest domain has been created with a virtual network interface controller. If no, control reenters operation 514 and repeat the operation until it determines that a new virtual machine or guest domain has been created. If yes, control enters operation 518, where control instructs a DMAP client 218 running on the hypervisor 210 to generate an UUID for the virtual network interface controller. At operation 522, control instruct the DMAP client 218 to construct a discover message 322 including the UUID, and the IP address of the physical network interface controller 207. The DMAP client 218 of the hypervisor 210 then broadcasts the discover message 322 to the network 310.

On the DMAP server 352 side, after start at operation 902, the computing device running the DMAP server boots up at operation 906. At operation 910, control of the DMAP server instructs the generation module 364 of the DMAP server 352 to generates a predetermined number of MAC addresses that are unique to each other. Control then stores the generated MAC addresses each in an entry of the data module 366 of the DMAP server 352. As described above, each of the entries has a empty field, in which later a UUID can be stored.

At operation 918, the DMAP server 352 monitors the network 310 and the detects discover message 322 is broadcasted in the network 310. Once the DMAP server 352 receives and accepts a discover message 322, control then exams the discover message 322 and retrieves the IP address and UUID included in the discover message. At operation 922, control instruct the data module 366 to determine whether the UUID is already stored in the data module. If yes, control enters operation 926. If no, control enters operation 930. At operation 926, control instructs the data module 366 to locate the data entry that stores the same UUID as the UUID included in the discover message 322 and then retrieve the MAC address stored in the data entry. At operation 930, control instructs the data module 366 to determine whether any unused MAC addresses are available in the data module 366. If there is at least one unused MAC address in the data module, control enters operation 934. If not, control enters operation 938. At operation 934, control instruct the data module 366 to retrieve one unused MAC address and will use that MAC address to construct an offer message 324. At operation 938, control instruct the generation module 364 to generate another unique MAC address and will use this unique MAC address to construct the offer message 324.

At operation 942, control constructs an offer message 324 that includes the available MAC address and the IP address of the DMAP server 352. Control then send the offer message 324 to the IP address extracted from the discover message 322 at operation 918.

Back to the hypervisor 210 side, after sending the discover message 322 at operation 522, control of the DMAP client 218 on the hypervisor enters operation 526 and waits for offer messages 324 sent from one or more DMAP servers 352, 354. Control receives one or more offer messages 324 and accepts the offer message 324 sent by the DMAP server at operation 942. Control examines the offer message 324 and extract the offered MAC address, the IP address of the offering DMAP server 352, and the UUID used to request the MAC address. Control then enters operation 530 and constructs a request message 326 including the offered MAC address and the UUID. Control then transmits, e.g. by unicast, the request message 326 to the DMAP server 352 using the IP address included in the offer message 324.

Back to the DMAP server 352 side, after transmitting the offer message 324 at operation 942, control enters operation 946. Control waits a request message 326 from the hypervisor 210 to confirm the hypervisor 210 accepted the offer MAC address. If control does not receive the request message 326 from the hypervisor for a predetermined period of time, control can use the MAC address for another UUID received from a different discover message. If control receives a request message 326 from the hypervisor 210 and, then, control enters operation 948. At operation 948 control determines whether the MAC address previously offered is still available. If yes, control enters operation 950. If no, control enters operation 952. At operation 950, control instructs the data module 366 to store the UUID in the same data entry having the offered MAC address or, in case that no such data a entry exists, to create a new data entry to store the UUID and the offered MAC address. Control constructs an acknowledgment message 328 if it determines that the offered MAC address is still available to the UUID at operation 946. The acknowledgment message 328 can include the offered MAC address and the UUID. The control can transmit the acknowledgment message 328 to the hypervisor using the IP address of the hypervisor. At operation 952, when control has determined that the offered MAC address is no longer available to the UUID, control constructs a negative acknowledgment message 330 and transmits the negative acknowledgment message 330 to the hypervisor 210 to inform it that the offered MAC address is no longer available.

Back to the hypervisor 210 side, after sending the request message 326 to the DMAP server 352 at operation 530, control of the DMAP client 218 enters operation 534 and wait for the acknowledgment message 328 or negative acknowledgment message 330 from the DMAP server 352. If control does not receive any acknowledgment messages 328 or receives a negative acknowledged message 330, control returns to operation 522. If control receives the acknowledgment message 328 sent from the DMAP server 352, control enters operation 538. At operation 538, control creates an entry in a data module 219 of the hypervisor 210 and stores the IP address of the DMAP server, the UUID, and the offered MAC address. At operation 542, the hypervisor determines, based on the UUID, the virtual network interface controller for which the MAC address is requested. The hypervisor 210 then retrieves the offered MAC address from the DMAP client 218 and assigns it to that virtual network interface controller 252.

Figure 5B:
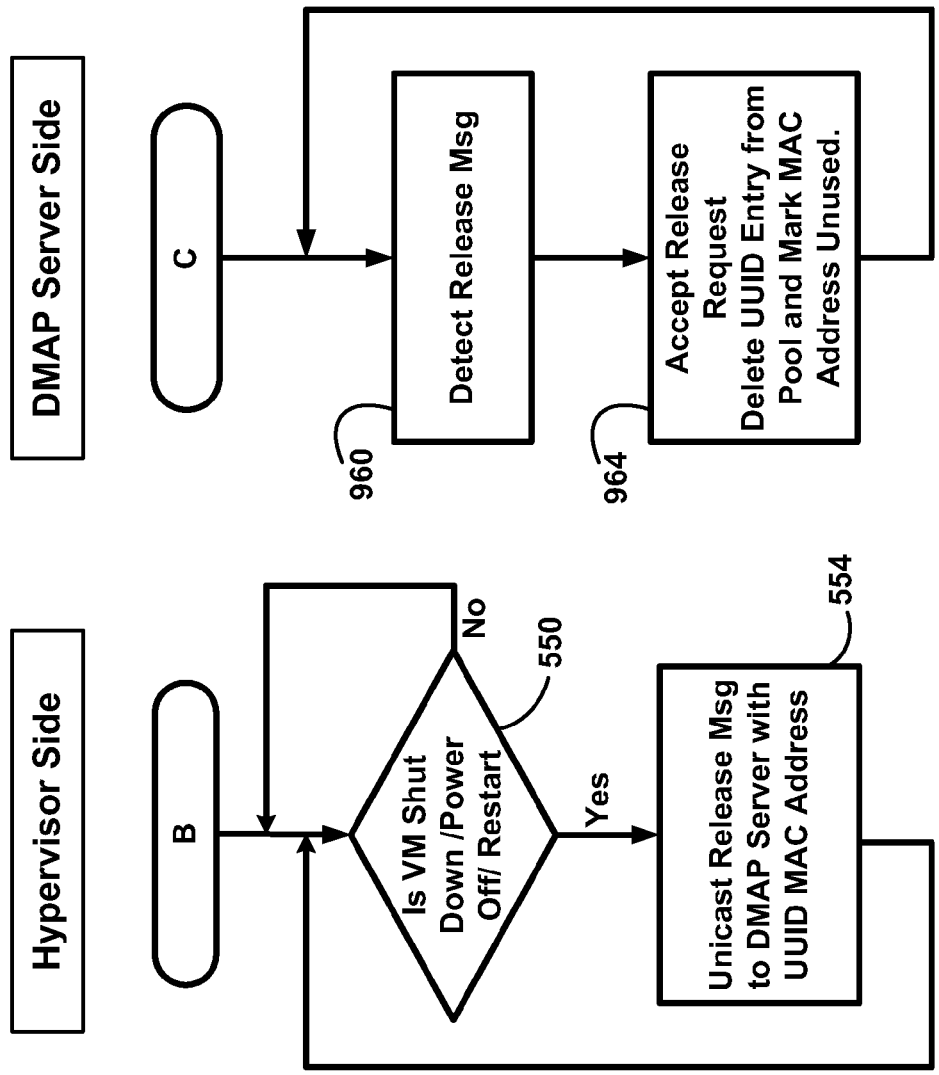

Referring to FIG. 5B, after control of the hypervisor 210 receives the IP address from the DHCP server, control can enter into another process and, at operation 550, determines if a new virtual machine hosted by the hypervisor is shutting down, powering off, or restarting. If no, control can wait for a predetermined period of time and reenters operation 550. If yes, control enters operation 554 and obtains the UUID associated with the virtual network interface controller of a shutting down/restarting virtual machine 234. Control retrieves a data entry from the data module 219 of the hypervisor 210 including the offered MAC address and the IP address of the offering DMAP server 352, and construct a release message 332 including the UUID as well as the offered MAC address. Control then transmits the release message 332 to the offering DMAP server 352 using the IP address.

At the DMAP server 352 side, after creating a MAC address pool at operation 910, control of the DMAP server 352 can start another process and, at operation 960, detects any release message 352 sent to the DMAP server 352. If control detects a release message 332, control enters operation 964. Control accepts the release message 332 and retrieves the UUID from the release message 332. Control then instructs the data module 366 to locate the data entry having the UUID and deletes the UUID from the data entry and mark the MAC address unused.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A system, comprising:
a hypervisor running on a first computing device in a network, the hypervisor hosting a first virtual machine having a first virtual network interface controller (NIC), the hypervisor being assigned a first network address;
a dynamic Media Access Control (MAC) address protocol (DMAP) client running on the hypervisor; and
a DMAP server running on a second computing device in the network, the DMAP server being assigned a second network address,
wherein the hypervisor and the DMAP client are configured to
generate a first universally unique identifier (UUID),
associate the first UUID with the first virtual NIC,
construct a first discover message including the first UUID and the first network address,
broadcast the first discover message in the network,
receive, from the DMAP server, a first offer message that is in response to the broadcasted first discover message, the first offer message having a first MAC address generated by the DMAP server, the first UUID, and the second network address,
in response to the first offer message, construct a first request message to indicate that the hypervisor has accepted the first offer message from the DMAP server, and transmit the first request message to the DMAP server using the second network address included in the first offer message, the first request message having the first UUID and the first MAC address included in the first offer message, and
in response to receiving an acknowledgement message from the DMAP server to indicate that the first MAC address is still available, assign the first MAC address to the first virtual NIC, the acknowledgement message having the first MAC address and the first UUID; and
wherein the DMAP server is configured to
generate the first MAC address,
receive the first discover message having the first UUID broadcasted in the network,
associate the first MAC address with the first UUID included in the first discover message,
construct the first offer message,
transmit the first offer message to the hypervisor using the first network address included in the first discover message,
receive the first request message from the hypervisor to indicate that the hypervisor has accepted the first offer message,
in response to receiving the first request message, determine whether the first MAC address is still available to be associated with the first UUID, and
in response to determining that the first MAC address is still available, transmit the acknowledgment message to the hypervisor.

2. The system of claim 1, wherein the DMAP server is configured to generate a set of three bytes and combine a predetermined organizationally unique identifier (OUI) and the set of three bytes to generate the first MAC address.

3. The system of claim 2, wherein the DMAP server further comprises:
a generation module configured to generate a plurality of MAC addresses that are unique to each other;

a first data module configured to store the plurality of MAC addresses and UUIDs associated with the plurality of MAC addresses; and a control module configured to instruct the data module to retrieve the first MAC address from the first data module by using the first UUID, where the first UUID is stored in the first data module as a UUID associated with the first MAC address, and instruct the first data module to retrieve the first MAC address that does not have an associated UUID from the first data module, where the first UUID has not been stored in the first data module, and further to instruct the first data module to store the first UUID as a UUID associated with the first MAC address.

4. The system of claim 3, wherein the first data module has a plurality of data entries each having a first field storing a respective one of the plurality of MAC addresses and a second field for storing a UUID; and wherein the control module is configured to instruct the first data module to locate a data entry whose second field stores the first UUID.

5. The system of claim 4, wherein the control module is configured to receive a release message having the first UUID and the first MAC address transmitted from the hypervisor, and instruct the first data module to locate a first data entry whose second field is the first UUID and to empty the second field of the first data entry.

6. The system of claim 1, wherein the DMAP server is further configured to in response to determining that the first MAC address is no longer available, transmit a negative acknowledgment message to the hypervisor.

7. The system of claim 1, wherein the hypervisor further hosts a second virtual machine having a second virtual NIC, and wherein the hypervisor and the DMAP client are configured to generate a second UUID, associate the second UUID with the second virtual NIC, construct a second discover message including the second UUID and the first network address, broadcast the second discover message in the network, receive, from the DMAP server, a second offer message that is in response to the broadcasted second discover message, the second offer message having a second MAC address generated by the DMAP server, the second UUID, and the second network address, and assign the second MAC address to the second virtual NIC.

8. The system of claim 1, wherein the hypervisor and the DMAP client are configured to assign the first MAC address to the first virtual NIC by:

detecting the acknowledgement message including the first MAC address and the first UUID transmitted from the DMAP server, and creating a first data entry, in a data module of the hypervisor, that includes the second network address, the first UUID, and the first MAC address.

9. The system of claim 8, wherein the hypervisor and the DMAP client are configured to, in response to that the first VM is shutting down or restarting, locate the first data entry in the data module of the hypervisor using the first UUID, retrieve the second network address and the first MAC address from the first data entry, construct a first release message having the first UUID and the first MAC address, and transmit the first release message to the DMAP server using the second network address.

10. A method for performing dynamic Media Access Control (MAC) address assignment by a system having a hypervisor running on a first computing device in a network, a dynamic MAC address protocol (DMAP) server running on a second computing device in the network, and a DMAP client running on the hypervisor hosting a first virtual machine having a first virtual network interface controller (NIC), the hypervisor being assigned a first network address, the DMAP server being assigned a second network address, the method comprising:

at the hypervisor and the DMAP client:

generating a first universally unique identifier (UUID);

associating the first UUID with the first virtual NIC;

constructing a first discover message including the first UUID and the first network address;

broadcasting the first discover message in the network;

receiving, from the DMAP server, a first offer message that is in response to the broadcasted first discover message, the first offer message having a first MAC address generated by the DMAP server, the first UUID, and the second network address;

in response to the first offer message, constructing a first request message to indicate that the hypervisor has accepted the first offer message from the DMAP server, and transmitting the first request message to the DMAP server using the second network address included in the first offer message, the first request message having the first UUID and the first MAC address included in the first offer message; and in response to receiving an acknowledgement message from the DMAP server to indicate that the first MAC address is still available, assigning the first MAC address to the first virtual NIC, the acknowledgement message having the first MAC address and the first UUID;

at the DMAP server:

generating the first MAC address;

receiving the first discover message broadcasted in the network;

associating the first MAC address with the first UUID included in the first discover message;

constructing the first offer message;

transmitting the first offer message to the hypervisor using the first network address in the first discover message;

receiving the first request message from the hypervisor to indicate that the hypervisor has accepted the first offer message;

in response to receiving the first request message, determining whether the first MAC address is still available to be associated with the first UUID, and in response to determining that the first MAC address is still available, transmitting the acknowledgment message to the hypervisor.

11. The method of claim 10, wherein the DMAP server is configured to generate the first MAC address by:

generating, at the DMAP server, a first NIC part of the first MAC address including a set of three bytes; and including the first NIC part in the first MAC address.

12. The method of claim 11, wherein the DMAP server is further configured to generate the first MAC address by:

combining a predetermined organizationally unique identifier (OUI) and the first NIC part to generate the first MAC address.

13. The method of claim 11, further comprising, at the DMAP server:
- generating a plurality of NIC parts of MAC addresses that are unique to each other;
- storing the plurality of NIC parts in a data module;
- instructing the first data module to retrieve data including the first NIC part from the first data module by using the first UUID, where the first UUID is stored in the data module as a UUID associated with the first NIC part; and
- instructing the data module to retrieve the first NIC part that does not have an associated UUID from the first data module, where the first UUID has not been stored in the data module, and further instructing the data module to store the first UUID as a UUID associated with the first NIC part.

14. The method of claim 13, wherein the first data module has a plurality of data entries each having a first field storing a respective one of the plurality of NIC parts and a second field for storing a UUID, the method further comprising:
- instructing, at the DMAP server, the first data module to locate a data entry whose second field stores the first UUID.

15. The method of claim 14, further comprising:
- receiving, at the DMAP server, a release message having the first UUID and the first NIC part transmitted from the hypervisor, and
- instructing the first data module to locate a first data entry whose second field is the first UUID and emptying the second field of the first data entry.

16. The method of claim 10, further comprising, at the DMAP server:
- in response to determining that the first MAC address is no longer available, transmitting a negative acknowledgment message to the hypervisor.

17. The method of claim 10, wherein the hypervisor further hosts a second virtual machine having a second virtual NIC, the method further comprising, at the hypervisor and the DMAP client:
- generating a second UUID;
- associating the second UUID with the second virtual NIC;
- constructing a second discover message including the second UUID and the first network address;
- broadcasting the second discover message in the network;
- receiving, from the DMAP server, a second offer message that is in response to the broadcasted second discover message, the second offer message having a second MAC address generated by the DMAP server, the second UUID, and the second network address;
- in response to the second offer message, constructing a second request message to indicate that the hypervisor has accepted the second offer message from the DMAP server, and transmitting the second request message to the DMAP server using the second network address included in the second offer message, the second request message having the second UUID and the second MAC address included in the second offer message; and
- in response to receiving a second acknowledgement message from the DMAP server to indicate that the second MAC address is still available, assigning the second MAC address to the second virtual NIC, the second acknowledgement message having the second MAC address and the second UUID.

18. The method of claim 10, wherein the hypervisor and the DMAP client are configured to assign the first MAC address to the first virtual NIC by:
- detecting the acknowledgement message including the first MAC address and the first UUID transmitted from the DMAP server; and
- creating a first data entry, in a second data module of the hypervisor, that includes the second network address, the first UUID, and the first MAC address.

19. The method of claim 18, further comprising, at the hypervisor and the DMAP client and in response to that the first VM is shutting down or restarting:
- locating the first data entry in the data module of the hypervisor using the first UUID;
- retrieving the second network address and the first NIC part from the first data entry;
- constructing a first release message having the first UUID and the first NIC part; and
- transmitting the first release message to the DMAP server using the second network address.

20. A dynamic Media Access Control (MAC) address protocol (DMAP) server for a system having a hypervisor running on a first computing device in a network, the DMAP server running on a second computing device in the network, and a DMAP client running on the hypervisor hosting a first virtual machine having a first virtual network interface controller (NIC), the hypervisor being assigned a first network address, the DMAP server being assigned a second network address, the DMAP server comprising computer-executable instructions stored thereon and, when executed, causing the DMAP server to be configured to
- generate a first NIC part of a first MAC address,
- generate the first MAC address, wherein the first MAC address includes the first NIC part;
- receive a first discover message having a first universally unique identifier (UUID) and the first network address broadcasted in the network from the hypervisor and the DMAP client, wherein the first UUID is associated with the first virtual NIC;
- associate the first MAC address with the first UUID,
- construct a first offer message in response to the broadcasted first discover message, the first offer message having the first MAC address, the first UUID, and the second network address, and
- transmit the first offer message to the hypervisor using the first network address included in the first discover message, wherein the hypervisor and the DMAP client is configured to assign the first MAC address to the first virtual NIC,
- receive a first request message from the hypervisor to indicate that the hypervisor has accepted the first offer message, the first request message having the first UUID and the first NIC part included in the first offer message,
- in response to receiving the first request message, determine whether the first NIC part is still available to be associated with the first UUID, and
- in response to determining that the first NIC part is still available, transmit an acknowledgment message to the hypervisor, the acknowledgement message having the first MAC address and the first UUID.

21. The DMAP server of claim 20, wherein the DMAP server is configured to generate the first NIC part including a set of three bytes.

22. The DMAP server of claim 20, wherein the DMAP server is configured to:
- generate the first NIC part including a set of three bytes, and
- combine a predetermined organizationally unique identifier (OUI) and the first NIC part to generate the first MAC address.

23. The DMAP server of claim 22, wherein the DMAP server further comprises:
- a generation module configured to generate a plurality of NIC parts that are unique to each other;
- a data module configured to store the plurality of NIC parts and UUIDs associated with the plurality of NIC parts; and
- a control module configured to
  - instruct the data module to retrieve the first NIC part from the data module by using the first UUID, where the first UUID is stored in the data module as a UUID associated with the first NIC part; and
  - instruct the data module to retrieve the first NIC part that does not have an associated UUID from the data module, where the first UUID has not been stored in the data module, and further to instruct the data module to store the first UUID as a UUID associated with the first NIC part.

24. The DMAP server of claim 23, wherein the data module has a plurality of data entries each having a first field storing a respective one of the plurality of NIC parts and a second field for storing a UUID, and
  - wherein the control module is configured to instruct the data module to locate a data entry whose second field stores the first UUID.

25. The DMAP server of claim 24, wherein the control module is configured to
  - receive a release message having the first UUID and the first NIC part transmitted in the network, and
  - instruct the data module to locate a first data entry whose second field is the first UUID and to empty the second field of the first data entry.

26. The DMAP server of claim 20, wherein the DMAP server is configured to:
  - in response to determining that the first NIC part is no longer available, transmit a negative acknowledgment message to the first network address.

* * * * *